(12) United States Patent
Kobayashi et al.

(10) Patent No.: US 11,306,874 B2
(45) Date of Patent: Apr. 19, 2022

(54) GAS SUPPLY SYSTEM AND METHOD FOR ESTIMATING INFERNAL PRESSURE OF GAS TANK

(71) Applicants: TOYOTA JIDOSHA KABUSHIKI KAISHA, Toyota (JP); HINO MOTORS, LTD., Hino (JP)

(72) Inventors: Kosuke Kobayashi, Toyota (JP); Yukihide Yokoyama, Toyota (JP)

(73) Assignee: TOYOTA JIDOSHA KABUSHIKI KAISHA

( * ) Notice: Subject to any disclaimer, the term of this patent is extended or adjusted under 35 U.S.C. 154(b) by 0 days.

(21) Appl. No.: 16/983,041

(22) Filed: Aug. 3, 2020

(65) Prior Publication Data

US 2021/0102667 A1    Apr. 8, 2021

(30) Foreign Application Priority Data

Oct. 3, 2019   (JP) .............................. JP2019-182814

(51) Int. Cl.
  *F17C 13/02*    (2006.01)
  *G05D 16/10*    (2006.01)
  *F17C 13/04*    (2006.01)

(52) U.S. Cl.
  CPC ............ *F17C 13/025* (2013.01); *F17C 13/04* (2013.01); *G05D 16/10* (2013.01);
  (Continued)

(58) Field of Classification Search
  CPC ............................ F17C 13/025; F17C 13/04; F17C 2270/0184; F17C 2250/043;
  (Continued)

(56) References Cited

U.S. PATENT DOCUMENTS

| 4,840,195 A | * | 6/1989 | Zabrenski | .............. G05D 16/10 137/312 |
| 8,783,284 B2 | * | 7/2014 | Kato | ................. H01M 8/04225 137/487 |

(Continued)

FOREIGN PATENT DOCUMENTS

| CN | 109282146 A | * | 1/2019 | |
| GB | 2554642 A | * | 4/2018 | .............. F17C 13/04 |

(Continued)

*Primary Examiner* — Timothy L Maust
*Assistant Examiner* — James R Hakomaki
(74) *Attorney, Agent, or Firm* — Dickinson Wright PLLC (57) ABSTRACT

A gas supply system includes: a gas tank; an unbalanced pressure reducing valve that reduces a pressure of the gas supplied from the gas tank; a pressure sensor that detects an outlet-side pressure of the pressure reducing valve; a flow rate changing unit that changes an outlet-side flow rate of the pressure reducing valve; and a control unit. The control unit changes the outlet-side flow rate between first and second flow rates, obtains a first pressure, which is a detection value of the pressure sensor when the outlet-side flow rate is the first flow rate, and a second pressure, which is a detection value of the pressure sensor when the outlet-side flow rate is the second flow rate, and estimates an inlet-side pressure of the pressure reducing valve using the relationship among the first flow rate, the second flow rate, and the difference between the first and second pressures.

6 Claims, 4 Drawing Sheets

(52) U.S. Cl.
CPC ............................ *F17C 2205/0323* (2013.01);
*F17C 2221/012* (2013.01); *F17C 2250/043*
(2013.01); *F17C 2250/0636* (2013.01); *F17C 2270/0184* (2013.01)

(58) Field of Classification Search
CPC ........ F17C 2250/0636; F17C 2221/012; F17C 2205/0323; F17C 2225/033; F17C 2223/036; F17C 2205/0326; F17C 2223/0123; F17C 2250/032; F17C 2265/066; F17C 2205/0338; F17C 2225/0123; F17C 2250/0626; F17C 2270/0168; G05D 16/10
USPC ............................................................ 141/1
See application file for complete search history.

(56) References Cited

U.S. PATENT DOCUMENTS

| | | | |
|---|---|---|---|
| 9,395,047 B2* | 7/2016 | Ding | F17C 13/025 |
| 2004/0161644 A1 | 8/2004 | Ueda et al. | |
| 2005/0061371 A1* | 3/2005 | Kimbara | F17C 13/025 |
| | | | 137/266 |
| 2006/0016512 A1* | 1/2006 | Takano | F17C 13/026 |
| | | | 141/82 |
| 2008/0038608 A1* | 2/2008 | Yoshida | H01M 8/04753 |
| | | | 429/415 |
| 2010/0006596 A1* | 1/2010 | Kanie | H01M 8/04955 |
| | | | 222/3 |
| 2013/0146176 A1* | 6/2013 | Yahashi | F17C 5/06 |
| | | | 141/4 |
| 2013/0255808 A1* | 10/2013 | Ninomiya | F02M 69/54 |
| | | | 137/624.27 |
| 2018/0038550 A1* | 2/2018 | Kondo | F17C 5/06 |
| 2018/0143095 A1* | 5/2018 | Fujita | B60L 58/40 |
| 2019/0173111 A1* | 6/2019 | Yamanaka | H01M 8/04761 |
| 2019/0293239 A1* | 9/2019 | Frenal | F17C 13/04 |
| 2020/0386369 A1* | 12/2020 | Ito | H01M 8/04 |

FOREIGN PATENT DOCUMENTS

| | | |
|---|---|---|
| JP | 2004179114 A | 6/2004 |
| JP | 2013191369 A | 9/2013 |

* cited by examiner

GAS SUPPLY SYSTEM AND METHOD FOR ESTIMATING INFERNAL PRESSURE OF GAS TANK

INCORPORATION BY REFERENCE

The disclosure of Japanese Patent Application No. 2019-182814 filed on Oct. 3, 2019 including the specification, drawings and abstract is incorporated herein by reference in its entirety.

BACKGROUND

1. Technical Field

The disclosure relates to gas supply systems and methods for estimating the internal pressure of a gas tank.

2. Description of Related Art

A system which supplies hydrogen to a fuel cell that consumes hydrogen and which includes a gas tank filled with hydrogen is known as a gas supply system. A method using a tank pressure sensor that directly detects the pressure in a gas tank is known as a method for estimating the remaining capacity of a gas tank (see, e.g., Japanese Unexamined Patent Application Publication No. 2004-179114 (JP 2004-179114 A)).

SUMMARY

It is desirable to use a sensor with a sufficiently wide detection range as the tank pressure sensor so that the pressure in the gas tank can be detected until the remaining capacity of the gas tank decreases from the full capacity to a very small value. However, the wider the detection range is, the lower the detection sensitivity is, and the larger the variation in detection value from the true value can be. A technique is therefore desired which accurately detects the pressure in a gas tank. Especially, a technique is desired which accurately detects the pressure in a gas tank when the remaining capacity of the gas tank has decreased and the pressure in the gas tank is relatively low.

The disclosure can be implemented in the following aspects.

(1) A first aspect of the disclosure relates to a gas supply system. The gas supply system includes: a gas tank that stores a compressed gas; a gas supply path connecting a gas consuming device that consumes the gas and the gas tank; an unbalanced pressure reducing valve in which an outlet-side pressure changes with an increase in inlet-side pressure and which is disposed in the gas supply path and reduces a pressure of the gas supplied from the gas tank; a pressure sensor that detects the outlet-side pressure of the pressure reducing valve; a flow rate changing unit that changes an outlet-side flow rate of the pressure reducing valve; and a control unit configured to drive the flow rate changing unit to change the outlet-side flow rate of the pressure reducing valve between a first flow rate and a second flow rate different from the first flow rate, obtain a first pressure and a second pressure from the pressure sensor, the first pressure being a detection value of the pressure sensor when the outlet-side flow rate is the first flow rate, and the second pressure being a detection value of the pressure sensor when the outlet-side flow rate is the second flow rate, and estimate the inlet-side pressure of the pressure reducing valve using a relationship among the first flow rate, the second flow rate, and a difference between the first pressure and the second pressure.

According to the gas supply system of this aspect, the pressure reducing valve is the unbalanced pressure reducing valve. When estimating the inlet-side pressure of the pressure reducing valve, the outlet-side flow rate of the pressure reducing valve is changed, and the outlet-side pressure of the pressure reducing valve is detected using the pressure sensor, and the difference between the outlet-side pressures before and after changing the outlet-side flow rate is used. The inlet-side pressure of the pressure reducing valve is thus estimated using the detection values of the pressure sensor that detects the outlet-side pressure of the pressure reducing valve. This configuration improves accuracy of estimation of the inlet-side pressure of the pressure reducing valve as compared to the case where the inlet-side pressure of the pressure reducing valve is detected using a sensor provided on the inlet-side of the pressure reducing valve. This configuration also improves accuracy of estimation of an internal pressure of the gas tank in the case where the internal pressure of the gas tank is obtained from the inlet-side pressure of the pressure reducing valve. This configuration improves the accuracy of estimation of the internal pressure of the gas tank especially when the remaining capacity of the gas tank is small and the inlet-side pressure of the pressure reducing valve is relatively low.

(2) The first flow rate may be a minimum flow rate of the outlet-side flow rate that is changed by the flow rate changing unit, and the second flow rate may be a maximum flow rate of the outlet-side flow rate that is changed by the flow rate changing unit. According to this gas supply system, the accuracy of estimation of the inlet-side pressure of the pressure reducing valve is further improved.

(3) The control unit may have a prestored map, the map indicating a relationship between the outlet-side pressure of the pressure reducing valve and the outlet-side flow rate of the pressure reducing valve which is obtained in advance for each inlet-side pressure of the pressure reducing valve. The control unit may estimate the inlet-side pressure of the pressure reducing valve by referring to the map and specifying the inlet-side pressure of the pressure reducing valve which corresponds to the difference between the first pressure and the second pressure detected by the pressure sensor. According to this gas supply system, the inlet-side pressure of the pressure reducing valve is accurately estimated by referring to the prestored map.

(4) The gas may be hydrogen, and the pressure reducing valve may include an inlet chamber into which the gas discharged from the gas tank flows, an outlet chamber into which the gas from the inlet chamber flows while being decompressed, a valve body that reciprocates in a specific direction in the inlet chamber to open and close a communication passage that allows the inlet chamber and the outlet chamber to communicate with each other, a piston that is integral with the valve body and that slides in the specific direction in the pressure reducing valve when the valve body opens and closes the communication passage, an atmospheric pressure chamber separated from the outlet chamber by the piston, a first spring that is disposed in the inlet chamber and that biases the valve body in a closing direction of the valve body, and a second spring that is disposed in the atmospheric pressure chamber and that biases the piston in an opening direction of the valve body. A relationship among the inlet-side pressure of the pressure reducing valve, the outlet-side pressure of the pressure reducing valve, and the outlet-side flow rate of the pressure reducing valve may be given by the following formula (1)

$$P_2 = -\frac{k_2 - k_1}{S_2(3.8 \cdot 120 \cdot P_1)(\alpha \cdot \pi \cdot D_1 \cdot \sin\beta)}\sqrt{\frac{T}{273}} \cdot Q - \frac{S_1}{S_2}P_1 + \frac{F_{k2} - F_{k1}}{S_2} \pm \frac{F_\mu}{S_2} + P_{atm},$$ (1)

where $P_2$ is the outlet-side pressure of the pressure reducing valve, $P_1$ is the inlet-side pressure of the pressure reducing valve, $P_{atm}$ is an atmospheric pressure, $k_1$ is a spring constant of the first spring, $k_2$ is a spring constant of the second spring, $S_1$ is an area of a cross section of the communication passage perpendicular to the specific direction, $S_2$ is an area of a cross section of the outlet chamber perpendicular to the specific direction, $F_{k1}$ is a force that is applied when the first spring biases the valve body in the closing direction, $F_{k2}$ is a force that is applied when the second spring biases the piston in the opening direction, $F_\mu$ is a frictional force during sliding of the piston, T is a temperature of the gas flowing through the pressure reducing valve, Q is the outlet-side flow rate of the pressure reducing valve, $D_1$ is a diameter of the cross section of the communication passage perpendicular to the specific direction, α is a contraction coefficient of an effective flow path when the gas flows through the communication passage, and β is an angle formed between a tip end of the valve body which faces the communication passage and the cross section of the communication passage perpendicular to the specific direction.

According to this gas supply system, the relationship between the outlet-side pressure of the pressure reducing valve and the outlet-side flow rate of the pressure reducing valve can be easily obtained for each inlet-side pressure of the pressure reducing valve by using the formula (1).

(5) The control unit may limit a flow rate of the gas that is supplied to the gas consuming device through the flow rate changing unit, when the estimated inlet-side pressure of the pressure reducing valve becomes equal to or lower than a predetermined reference pressure. According to this gas supply system, control associated with the limitation of the flow rate of the gas that is supplied to the gas consuming device can be appropriately performed using the accurately detected inlet-side pressure of the pressure reducing valve.

(6) A second aspect of the disclosure relates to a method for estimating an internal pressure of a gas tank in a gas supply system including the gas tank that stores a compressed gas. The gas supply system further includes: a gas supply path connecting a gas consuming device that consumes the gas and the gas tank; an unbalanced pressure reducing valve in which an outlet-side pressure changes with an increase in inlet-side pressure and which is disposed in the gas supply path and reduces a pressure of the gas supplied from the gas tank; a pressure sensor that detects the outlet-side pressure of the pressure reducing valve; and a flow rate changing unit that changes an outlet-side flow rate of the pressure reducing valve. This method includes: driving the flow rate changing unit to change the outlet-side flow rate of the pressure reducing valve between a first flow rate and a second flow rate different from the first flow rate; obtaining a first pressure and a second pressure from the pressure sensor, the first pressure being a detection value of the pressure sensor when the outlet-side flow rate is the first flow rate, and the second pressure being a detection value of the pressure sensor when the outlet-side flow rate is the second flow rate; and estimating the inlet-side pressure of the pressure reducing valve using a relationship among the first flow rate, the second flow rate, and a difference between the first pressure and the second pressure.

The disclosure can be implemented in various forms other than the gas supply system. For example, the disclosure can be implemented in forms such as a hydrogen gas supply system, a fuel cell system, a method for estimating an internal pressure of a gas tank in a gas supply system including the gas tank, a method for controlling a gas supply system, a computer system that implements the control method, and a non-transitory storage medium having the computer program recorded thereon.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. Overall System Configuration

Figure 1:
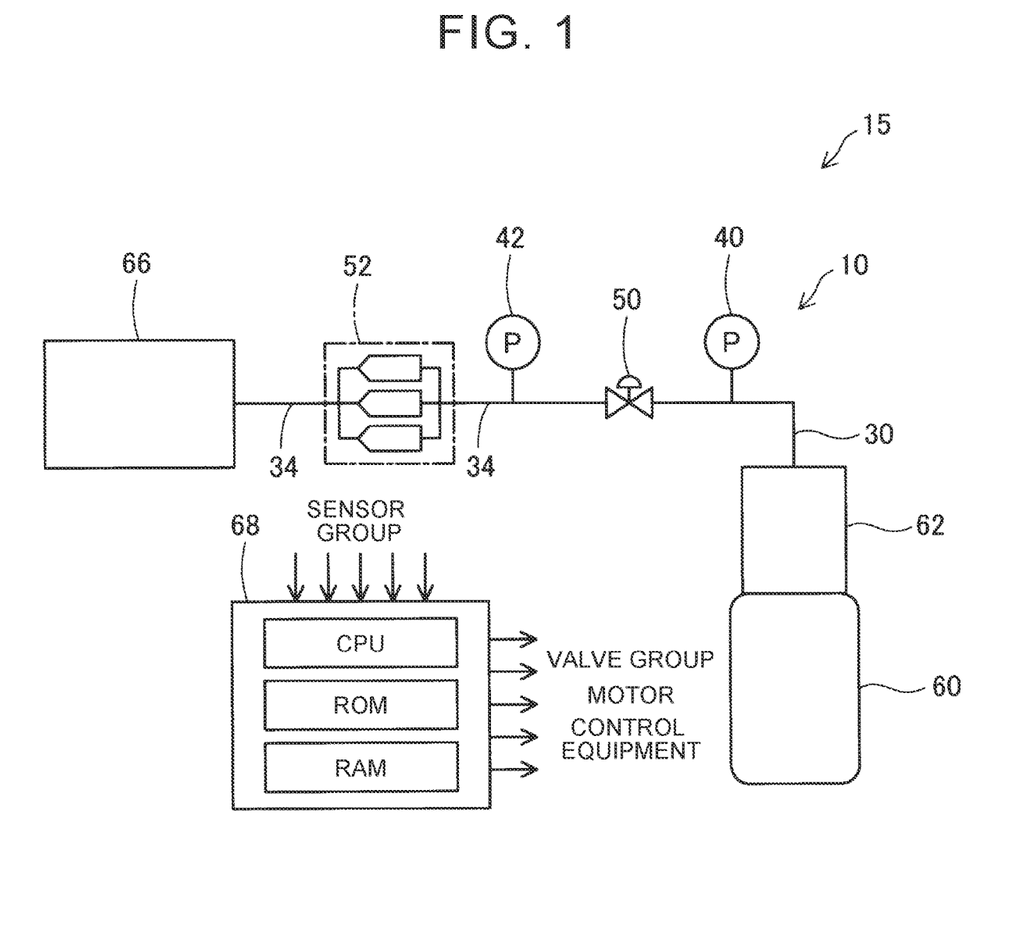
FIG. 1 illustrates the general configuration of a fuel cell system.

FIG. 1 illustrates the general configuration of a fuel cell system 15 that is an embodiment of the disclosure. In the present embodiment, the fuel cell system 15 is mounted on a fuel cell vehicle.

The fuel cell system 15 is a system for generating electric power to be used by a drive motor, not shown, mounted on the fuel cell vehicle. The fuel cell system 15 includes a fuel cell stack 66 and a gas supply system 10 for supplying hydrogen, which is a fuel gas, to the fuel cell stack 66. The gas supply system 10 includes a hydrogen tank 60, a supply pipe 30, and a control unit 68. The supply pipe 30 connects the hydrogen tank 60 and the fuel cell stack 66. The supply pipe 30 is also called the "gas supply path." FIG. 1 shows only a part of the configuration of the fuel cell system 15 which is related to supply of hydrogen to the fuel cell stack 66. The fuel cell system 15 further includes a configuration for filling the hydrogen tank 60 with hydrogen, a configuration related to discharge of hydrogen (anode off-gas) from the fuel cell stack 66, a configuration that causes an oxidizing gas containing oxygen to flow into the fuel cell stack 66, and a configuration that causes a cooling medium to flow into the fuel cell stack 66, description thereof will be omitted.

The fuel cell stack 66 is a power generation device for causing an electrochemical reaction between the fuel gas and the oxidizing gas to output electric power, and has a stacked configuration of a plurality of single cells. The fuel cell stack 66 of the present embodiment is a polymer electrolyte fuel cell stack. However, the fuel cell stack 66 may be other type of fuel cell stack. In each single cell of the fuel cell stack 66, a flow path through which hydrogen that is the fuel gas flows is formed on the anode side (hereinafter this flow path is also referred to as the anode-side flow path), and a flow path through which air that is the oxidizing gas flows is formed on the cathode side (hereinafter this flow path is also referred to as the cathode-side flow path). These flow paths are formed with an electrolyte membrane interposed therebetween.

The hydrogen tank 60 is a device that stores compressed hydrogen to be supplied to the fuel cell stack 66. For example, the hydrogen tank 60 may be a resin tank having a fiber-reinforced plastic (FRP) layer on the outer surface of a resin liner. The FRP layer is formed by winding fibers containing a thermosetting resin around the resin liner. The hydrogen tank 60 includes a boss 62 having a valve mechanism, not shown, therein. The valve mechanism in the boss 62 includes a shut-off valve that shuts off communication state between the hydrogen tank 60 and the supply pipe 30.

The hydrogen tank 60 of the present embodiment is filled with hydrogen so that the internal pressure becomes equal to about 70 MPa when fully filled. For such a high-pressure gas tank, the lower limit of the internal pressure is set to a minimum allowable pressure, and the remaining capacity of the tank is controlled so that the internal pressure does not become lower than the minimum allowable pressure. The hydrogen tank 60 is structured on the assumption that a pressure toward the outside is always applied to the tank wall. For example, the minimum allowable pressure can therefore be set so as to stably maintain such a structure. The minimum allowable pressure may be, e.g., about 1 to 2 MPa.

The supply pipe 30 is provided with a pressure reducing valve 50 and an injector unit 52 in this order from the upstream side of the hydrogen flow. The pressure of hydrogen at the time hydrogen is discharged from the hydrogen tank 60 to the supply pipe 30 is considered to be equal to the internal pressure of the hydrogen tank 60 (hereinafter also referred to as the tank pressure), and the pressure reducing valve 50 reduces the pressure of such high pressure hydrogen discharged from the hydrogen tank 60. The pressure reducing valve 50 reduces the pressure of hydrogen to, e.g., about 1 to 1.5 MPa. The configuration of the pressure reducing valve 50 will be described later in detail. The injector unit 52 controls the amount of hydrogen to be supplied to the fuel cell stack 66. In the present embodiment, the injector unit 52 includes a plurality of injectors connected in parallel. Although FIG. 1 shows three injectors connected in parallel, the injector unit 52 may include one injector or a plurality of injectors other than three. The injector unit 52 may include any number of injectors as long as the injector unit 52 can change the amount of hydrogen to be supplied to the fuel cell stack 66. Each injector included in the injector unit 52 has a solenoid operated valve therein, and the injector unit 52 changes the amount of hydrogen to be supplied from the hydrogen tank 60 to the fuel cell stack 66 by opening and closing the solenoid operated valve of each injector. In the present embodiment, the injector unit 52 controls the amount of hydrogen to be supplied from the hydrogen tank 60 by changing the number of injectors whose solenoid operated valve is opened. The injector unit 52 is also referred to as the "flow rate changing unit."

The supply pipe 30 is further provided with a first pressure sensor 42 and a second pressure sensor 40. The first and second pressure sensors 42, 40 are sensors that detect the gas pressure in the supply pipe 30. The first pressure sensor 42 is provided between the pressure reducing valve 50 and the injector unit 52, and the second pressure sensor 40 is provided between the pressure reducing valve 50 and the hydrogen tank 60. The detection value of the second pressure sensor 40 disposed upstream of the pressure reducing valve 50 is a value indicating the pressure in the hydrogen tank 60 when hydrogen is discharged from the hydrogen tank 60. The detection value of the first pressure sensor 42 disposed downstream of the pressure reducing valve 50 is smaller than the detection value of the second pressure sensor 40. The second pressure sensor 40 is also referred to as the "high pressure sensor," and the first pressure sensor 42 is also referred to as the "medium pressure sensor."

For example, a gas containing hydrogen (anode off-gas), which is discharged from the fuel cell stack 66 after flowing through the anode-side flow paths in the fuel cell stack 66, may be guided to the downstream side of the injector unit 52 in the supply pipe 30 and supplied back to the fuel cell stack 66.

The control unit 68 is what is called a microcomputer including a CPU that performs logical operations, a ROM, a RAM, etc. The control unit 68 obtains detection signals from various sensors such as the first pressure sensor 42 and the second pressure sensor 40 and outputs drive signals to each unit of the fuel cell system 15. The control unit 68 performs control related to control of the remaining capacity of the hydrogen tank 60 and control related to the amount of electricity that is generated by the fuel cell stack 66. The control unit 68 may not be a single control unit that performs all of the controls related to the fuel cell system 15. The control unit 68 may be composed of separate control units (electronic control unit (ECUs) that perform individual controls including the control related to control of the remaining capacity of the hydrogen tank 60 and that send and receive information to and from each other.

B. Pressure Reducing Valve

Figure 2:
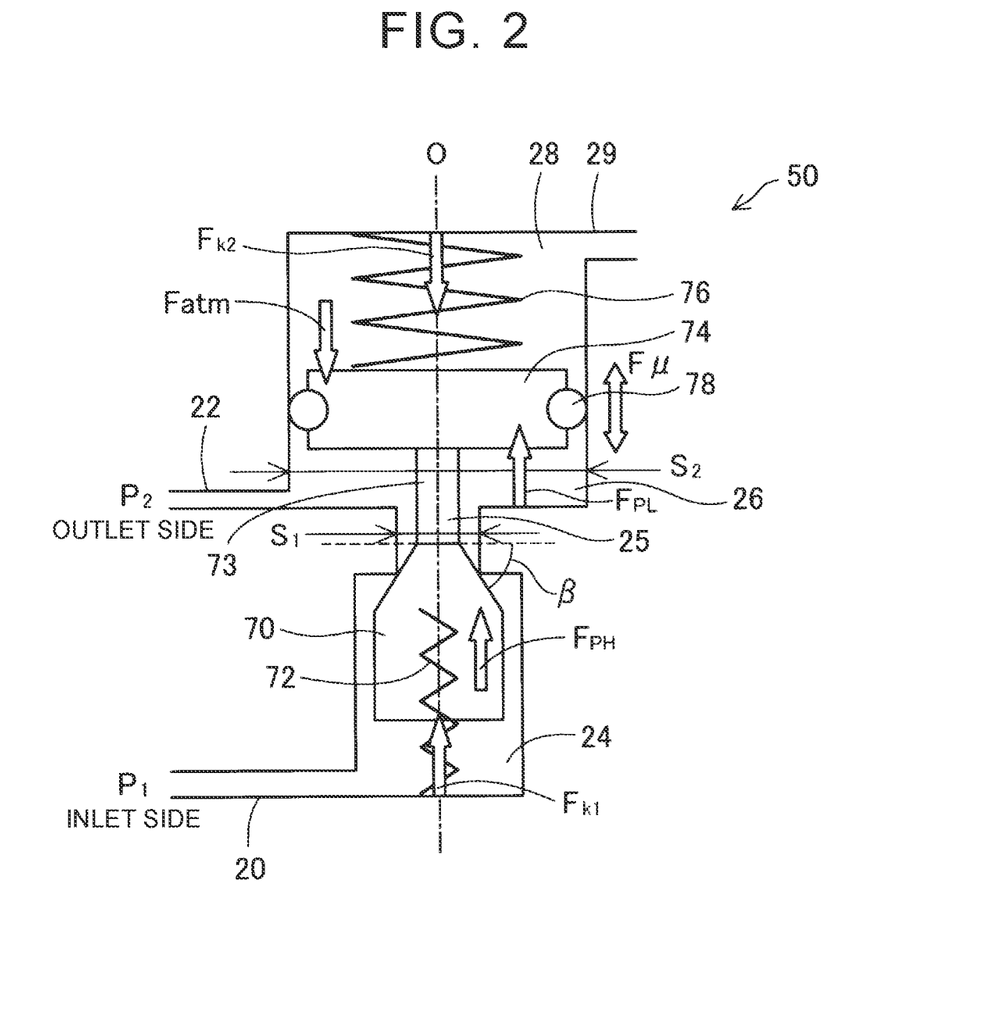
FIG. 2 schematically illustrates the internal configuration of a pressure reducing valve.

FIG. 2 schematically illustrates the internal configuration of the pressure reducing valve 50. The pressure reducing valve 50 includes an inlet introducing passage (primary introducing passage) 20, an inlet chamber (primary chamber) 24, a communication passage 25, an outlet chamber (secondary chamber) 26, an outlet discharge passage (secondary discharge passage) 22, an atmospheric pressure chamber 28, an atmosphere opening passage 29, a valve body 70, a through portion 73, a piston 74, a seal unit 78, a first spring 72, and a second spring 76.

The inlet introducing passage 20 is connected to the supply pipe 30 so as to communicate with the hydrogen tank 60. The inlet chamber 24 is a space which is provided in the pressure reducing valve 50 so as to communicate with the inlet introducing passage 20 and into which hydrogen discharged from the hydrogen tank 60 flows. The inlet chamber 24 has a cylindrical outer wall. The communication passage 25 is continuous with the inlet chamber 24, has a cylindrical outer wall, and has an inside diameter smaller than that of the inlet chamber 24. The outlet chamber 26 is a space which is continuous with the communication passage 25 and into which hydrogen from the inlet chamber 24 flows via the communication passage 25 while being decompressed. The outlet chamber 26 has a cylindrical outer wall having an inside diameter larger than that of the communication passage 25. The outlet discharge passage 22 communicates with the outlet chamber 26 and is connected to the supply pipe 30 so as to communicate with the injector unit 52. The atmospheric pressure chamber 28 is a space having a common cylindrical outer wall with the outlet chamber 26. The atmospheric pressure chamber 28 is separated from the outlet chamber 26 by the piston 74. The atmosphere opening passage 29 allows the atmospheric pressure chamber 28 to communicate with the outside of the pressure reducing valve 50 so that the atmospheric pressure chamber 28 is open to the atmosphere. In FIG. 2, the center line common to the inlet chamber 24, the communication passage 25, the outlet chamber 26, and the atmospheric pressure chamber 28 is shown as an axis O of the pressure reducing valve 50. A direction parallel to the axis O is also referred to as the "axial direction" or the "specific direction."

The valve body 70 is disposed in the inlet chamber 24. The valve body 70 reciprocates in the axial direction in the inlet chamber 24. With this reciprocating motion, the valve body 70 repeatedly contacts and separates from the boundary with the communication passage 25 which is located inside the outer wall of the inlet chamber 24, thereby opening and closing the communication passage 25. In the axial direction, the direction in which the valve body 70 moves to open the communication passage 25 is also referred to as the "opening direction," and the direction in which the valve body 70 moves to close the communication passage 25 is also referred to as the "closing direction." A tip end of the valve body 70 which faces the communication passage 25 is in the shape of a truncated cone that is tapered with a constant slope toward the outlet chamber 26. The through portion 73 is continuous with the valve body 70 and is disposed so as to extend through the communication passage 25. The through portion 73 is in the shape of a cylinder whose central axis is aligned with the axis O, and the diameter of its cross section perpendicular to the axial direction is smaller than the inside diameter of the communication passage 25. The piston 74 is continuous with the through portion 73. The piston 74 is disposed within the common cylindrical outer wall of the outlet chamber 26 and the atmospheric pressure chamber 28. The piston 74 is in the shape of a cylinder whose central axis is aligned with the axis O, and the diameter of its cross section perpendicular to the axis direction is slightly smaller than the inside diameter of the common cylindrical outer wall of the outlet chamber 26 and the atmospheric pressure chamber 28. The seal unit 78 is a ring-shaped member fixed to the side surface of the piston 74. The seal unit 78 is in contact with the inner surface of the common cylindrical outer wall of the outlet chamber 26 and the atmospheric pressure chamber 28 and seals between the outlet chamber 26 and the atmospheric pressure chamber 28 while allowing the piston 74 to slide in the axial direction within the common cylindrical outer wall of the outlet chamber 26 and the atmospheric pressure chamber 28. When opening and closing the communication passage 25, the valve body 70, the through portion 73, and the piston 74 reciprocate together in the axial direction.

The first spring 72 is disposed in the inlet chamber 24 and is connected to the outer wall of the inlet chamber 24 and the valve body 70. The first spring 72 biases the valve body 70 in the closing direction. The second spring 76 is disposed in the atmospheric pressure chamber 28 and is connected to the outer wall of the atmospheric pressure chamber 28 and the piston 74. The second spring 76 biases the piston 74 in the opening direction.

In the pressure reducing valve 50, forces $F_{k1}$, $F_{PH}$, and $F_{PL}$ act in the closing direction. $F_{k1}$ is the force that is applied when the first spring 72 biases the valve body 70 in the closing direction. $F_{PH}$ is the force that is applied when an inlet-side pressure of the pressure reducing valve 50 (hereinafter also referred to as the inlet pressure (primary pressure) $P_1$) in the inlet chamber 24 presses the valve body 70 in the closing direction. $F_{PL}$ is the force that is applied when an outlet-side pressure of the pressure reducing valve 50 (hereinafter also referred to as the outlet pressure (secondary pressure) $P_2$) in the outlet chamber 26 presses the piston 74 in the closing direction. In the pressure reducing valve 50, forces $F_{k2}$ and $F_{atm}$ act in the opening direction. $F_{k2}$ is the force that is applied when the second spring 76 biases the piston 74 in the opening direction, and $F_{atm}$ is the force that is applied when the atmospheric pressure in the atmospheric pressure chamber 28 presses the piston 74 in the opening direction. In the pressure reducing valve 50, a frictional force $F_\mu$ acts between the seal unit 78 and the inner surface of the common outer wall of the outlet chamber 26 and the atmospheric pressure chamber 28 when the valve body 70, the through portion 73, and the piston 74 reciprocate together in the axial direction. The direction of the frictional force $F_\mu$ changes according to the direction of motion of the valve body 70, the through portion 73, and the piston 74.

The pressure reducing valve 50 operates so that the total of the forces acting in the closing direction and the total of the forces acting in the opening direction are balanced. The pressure reducing valve 50 thus reduces the pressure of the high pressure gas in the inlet chamber 24 and causes the resultant gas to flow into the outlet chamber 26. For example, when the valve body 70 closes the communication passage 25, the high pressure gas no longer flows from the inlet chamber 24 into the outlet chamber 26 and therefore the force $F_{PL}$ acting in the closing direction decreases. As a result, the total of the forces acting in the opening direction becomes larger than the total of the forces acting in the closing direction. The valve body 70 etc. therefore move in the opening direction and the communication passage 25 is opened. Accordingly, the pressure in the outlet chamber 26 increases, and the force $F_{PL}$ acting in the closing direction increases. As a result, the total of the forces acting in the closing direction becomes larger than the total of the forces acting in the opening direction. The valve body 70 etc. therefore move in the closing direction and the communication passage 25 is closed.

The pressure reducing valve 50 of the present embodiment is a piston type unbalanced pressure reducing valve. In a balanced pressure reducing valve, the outlet pressure is controlled to be constant. In an unbalanced pressure reducing valve, on the other hand, the outlet pressure changes as the inlet pressure increases. That is, the unbalanced pressure reducing valve is a pressure reducing valve that has such properties that the outlet pressure increases or decreases as the inlet pressure increases. In the pressure reducing valve 50 of the present embodiment, the outlet pressure when the outlet-side flow rate of the pressure reducing valve 50 is zero decreases as the inlet pressure increases. The outlet pressure $P_2$ and the outlet flow rate (hereinafter also referred to as the outlet flow rate (secondary flow rate) Q) of the pressure reducing valve 50 have a certain relationship when the outlet flow rate Q is changed. Specifically, the outlet pressure $P_2$ decreases as the outlet flow rate Q increases. The outlet flow rate Q is the flow rate of the gas that is discharged from the outlet chamber 26.

Figure 3:
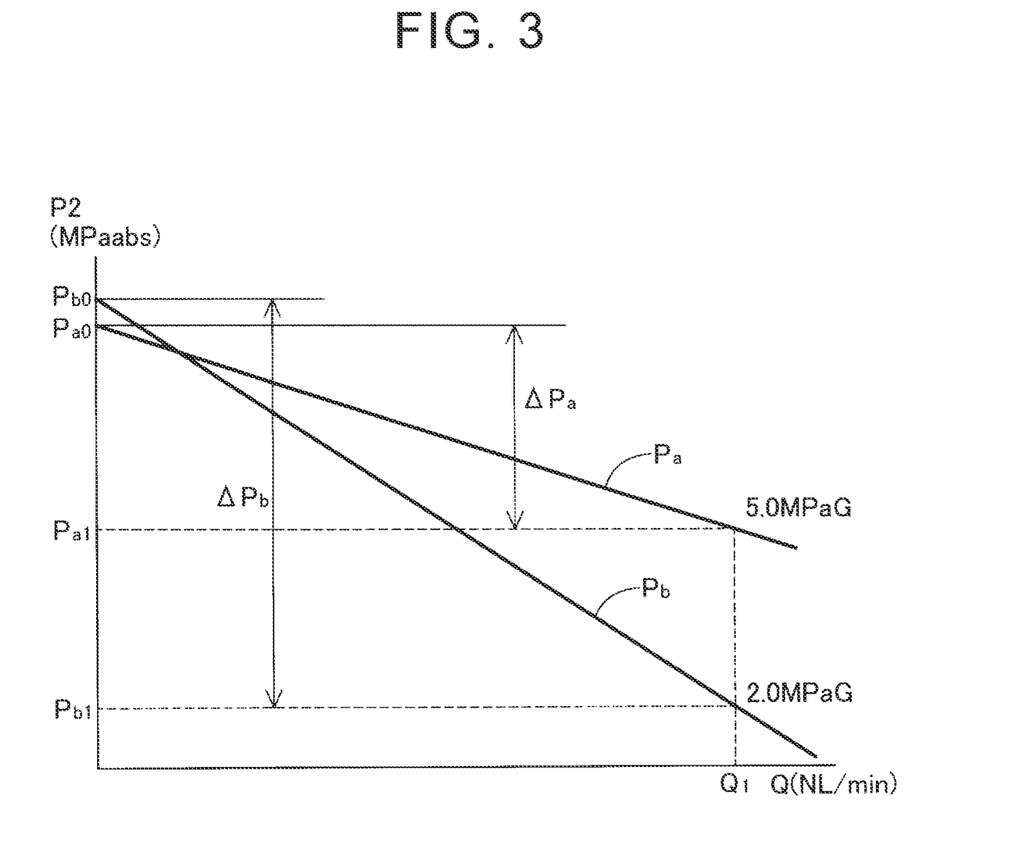
FIG. 3 is a graph illustrating the relationship between the outlet flow rate and the outlet pressure of the pressure reducing valve.

FIG. 3 is a graph illustrating the relationship between the outlet flow rate and the outlet pressure of the pressure reducing valve 50. In FIG. 3, the abscissa represents the outlet flow rate Q, and the ordinate represents the outlet pressure $P_2$. As shown in FIG. 3, the relationship between the outlet flow rate Q and the outlet pressure $P_2$ of the pressure reducing valve 50 can be approximated by a linear function. This relationship between the outlet flow rate Q and the outlet pressure $P_2$ changes with the inlet pressure $P_1$ of the pressure reducing valve 50. FIG. 3 illustrates the relationship between the outlet flow rate Q and the outlet pressure $P_2$ of the pressure reducing valve 50 for the inlet pressures $P_1$ of 5.0 MPa and 2.0 MPa. As shown in FIG. 3, the lower the inlet pressure $P_1$ is, the steeper the slope of the change in outlet pressure $P_2$ with respect to the change in outlet flow rate Q is. This is considered to be because, as the inlet pressure $P_1$ decreases, the capacity for gas supply from the inlet chamber 24 to the outlet chamber 26 decreases and the sensitivity of variation in outlet pressure $P_2$ to variation in outlet flow rate Q increases.

In the fuel cell system 15 of the present embodiment, the inlet pressure $P_1$ of the pressure reducing valve 50 is estimated based on the above properties of the pressure reducing valve 50, namely such properties that the sensitivity of variation in outlet pressure $P_2$ to variation in outlet flow rate Q increases as the inlet pressure $P_1$ decreases. Specifically, the relationship between the outlet flow rate Q and the outlet pressure $P_2$ is first obtained for each inlet pressure $P_1$. The outlet flow rate Q is changed between a first flow rate and a second flow rate different from the first flow rate to detect a first pressure and a second pressure. The first pressure is the outlet pressure $P_2$ when the outlet flow rate Q is the first flow rate, and the second pressure is the outlet pressure $P_2$ when the outlet flow rate Q is the second flow rate. The inlet pressure $P_1$ is estimated using the relationship among the first flow rate, the second flow rate, and the difference between the first pressure and the second pressure.

For example, as shown in FIG. 3, in the case where the inlet pressure $P_1$ of the pressure reducing valve 50 is 5.0 MPa, the outlet pressure $P_2$ is $P_{a0}$ when the outlet flow rate Q is 0. When the outlet flow rate Q increases to $Q_1$, the outlet pressure $P_2$ decreases to $P_{a1}$. Accordingly, the amount of change $\Delta P_a$ in outlet pressure $P_2$ which occurs when the outlet flow rate Q increases from 0 to $Q_1$ is given by "$P_{a0}-P_{a1}$." As shown in FIG. 3, in the case where the inlet pressure $P_1$ of the pressure reducing valve 50 is 2.0 MPa, the outlet pressure $P_2$ is $P_{b0}$ when the outlet flow rate Q is 0. When the outlet flow rate Q increases to $Q_1$, the outlet pressure $P_2$ decreases to $P_{b1}$. Accordingly, the amount of change $\Delta P_b$ in outlet pressure $P_2$ which occurs when the outlet flow rate Q increases from 0 to $Q_1$ is given by "$P_{b0}-P_{b1}$." As described above, when the relationship between the outlet flow rate Q and the outlet pressure $P_2$ for each inlet pressure $P_1$ is known in advance, the inlet pressure $P_1$ can be estimated from the amount of change in outlet pressure $P_2$ which occurs when the outlet flow rate Q increases from 0 to $Q_1$.

In the fuel cell system 15 of the present embodiment, the relationship between the outlet flow rate Q and the outlet pressure $P_2$ of the pressure reducing valve 50 for various inlet pressures $P_1$ is prestored in a storage unit in the control unit 68. For example, the relationship between the outlet flow rate Q and the outlet pressure $P_2$ for each inlet pressure $P_1$ as shown in FIG. 3 may be obtained by experiments or may be obtained by simulations. As shown in FIG. 2, the pressure reducing valve 50 operate so that the total of the forces $F_{k1}$, $F_{PH}$, and $F_{PL}$ acting in the closing direction, the total of the forces $F_{k2}$ and $F_{atm}$ acting in the opening direction, and the frictional force $F_\mu$ between the seal unit 78 and the inner surface of the common outer wall of the outlet chamber 26 and the atmospheric pressure chamber 28 are balanced. Based on the relationship of these forces, the relationship among the outlet pressure $P_2$, the inlet pressure $P_1$, and the outlet flow rate Q is given by, e.g., the following approximation formula (1). For example, the relationship thus obtained is stored as a map.

$$P_2 = -\frac{k_2 - k_1}{S_2(3.8 \cdot 120 \cdot P_1)(\alpha \cdot \pi \cdot D_1 \cdot \sin\beta)} \sqrt{\frac{T}{273}} \cdot Q - \frac{S_1}{S_2} P_1 + \frac{F_{k2} - F_{k1}}{S_2} \pm \frac{F_\mu}{S_2} + P_{atm}. \quad (1)$$

In the formula (1), $P_{atm}$ is the atmospheric pressure, $k_1$ is the spring constant of the first spring 72, and $k_2$ is the spring constant of the second spring 76. $S_1$ is the area of the cross section of the communication passage 25 perpendicular to the axial direction. $S_2$ is the area of the cross section of the outlet chamber 26 perpendicular to the axial direction. $F_{k1}$ is the force that is applied when the first spring 72 biases the valve body 70 in the closing direction. $F_{k2}$ is the force that is applied when the second spring 76 biases the piston 74 in the opening direction. $F_\mu$ is the frictional force during sliding of the piston 74. T is the temperature of the gas flowing through the pressure reducing valve 50. $D_1$ is the diameter of the cross section of the communication passage 25 perpendicular to the axial direction, $\alpha$ is the contraction coefficient of the effective flow path when the gas flows through the communication passage 25, and $\beta$ is the angle formed between the tip end of the valve body 70 which faces the communication passage 25 and the cross section of the communication passage 25 perpendicular to the axial direction (see FIG. 2).

C. Control with Detection of Tank Pressure

Figure 4:
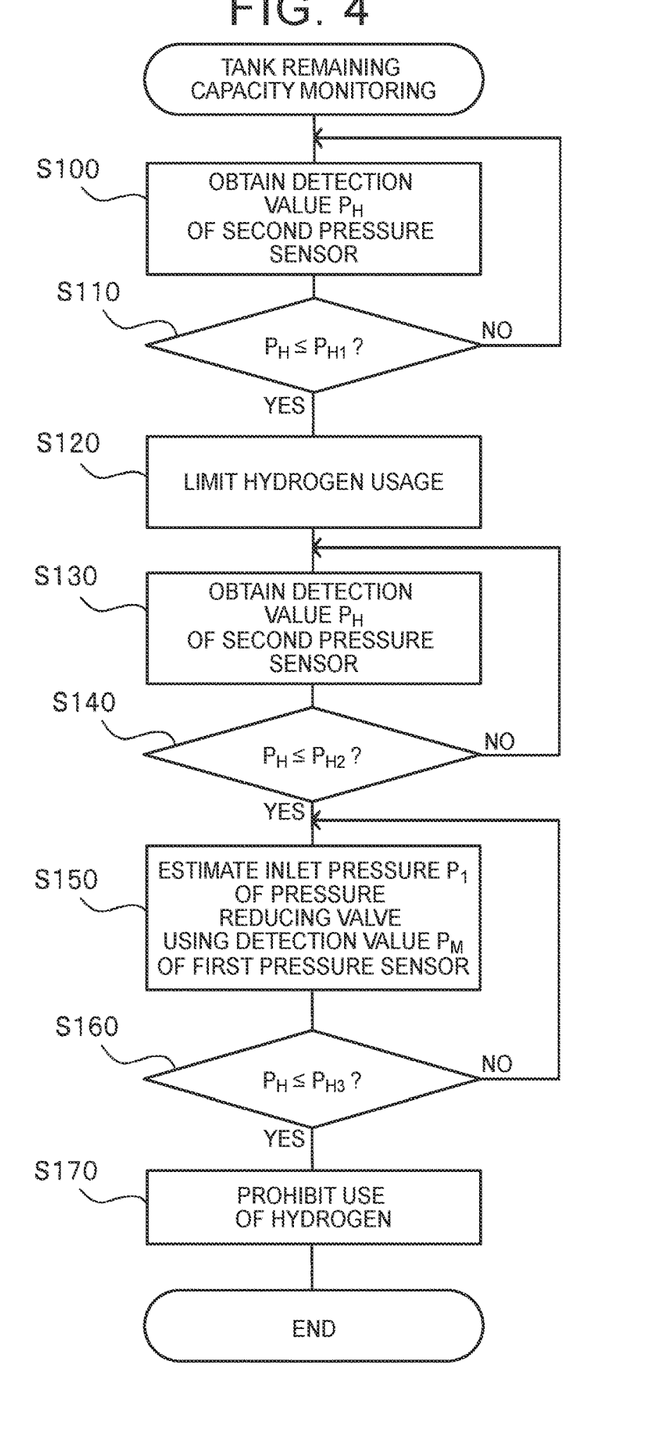
FIG. 4 is a flowchart of a tank remaining capacity monitoring routine.

FIG. 4 is a flowchart of a tank remaining capacity monitoring routine that is executed by the control unit 68 of the fuel cell system 15 of the present embodiment. In the fuel cell system 15, the remaining capacity of the hydrogen tank 60 is monitored and hydrogen usage is controlled so that the remaining capacity of the hydrogen tank 60 does not become smaller than a predetermined lower limit. This routine is started in response to a command to start the fuel cell system 15, specifically, when a start button (not shown) of the fuel cell vehicle is pressed, and is executed when the fuel cell system 15 is in operation.

When the tank remaining capacity monitoring routine of FIG. 4 is started, the CPU of the control unit 68 obtains a detection value PH of the second pressure sensor 40 that is the high pressure sensor (step S100). The CPU of the control unit 68 compares the obtained detection value PH with a predetermined first in-use lower limit pressure $P_{H1}$ (step S110). The detection value PH of the second pressure sensor 40 indicates the inlet pressure $P_1$ of the pressure reducing valve 50 which is the internal pressure of the hydrogen tank 60 that discharges hydrogen into the supply pipe 30. The first in-use lower limit pressure $P_{H1}$ is a value that is set in advance as a value for determining that the remaining capacity of the hydrogen tank 60 has decreased. The first in-use lower limit pressure $P_{H1}$ is set to a value larger than a second in-use lower limit pressure $P_{H2}$ and a third in-use lower limit pressure $P_{H3}$ which will be described later.

When the fuel cell system 15 is started and the fuel cell stack 66 starts generating electricity, hydrogen in the hydrogen tank 60 is consumed and the pressure in the hydrogen tank 60 gradually decreases, and therefore the detection value PH of the second pressure sensor 40 gradually decreases accordingly. When the detection value PH of the second pressure sensor 40 is larger than the first in-use lower limit pressure $P_{H1}$ (step S110: NO), the CPU of the control unit 68 repeats steps S100 and S110 until the detection value PH becomes equal to or smaller than the first in-use lower limit pressure $P_{H1}$.

When the CPU of the control unit 68 determines that the detection value PH of the second pressure sensor 40 is equal to or smaller than the first in-use lower limit pressure $P_{H1}$ (step S110: YES), the CPU of the control unit 68 switches control to limit hydrogen usage by the fuel cell stack 66 while supplying hydrogen to the fuel cell stack 66 (step S120). For example, the CPU of the control unit 68 switches control to limit the output of the fuel cell stack 66 (the electric power that is generated by the fuel cell stack 66) to 80% or less of its maximum normal power generation. Although steps S100 to S120 are not essential, it is desirable to perform steps S100 to S120 because limiting the hydrogen usage when the remaining capacity of the hydrogen tank 60 has decreased to some extent increases the power generation duration of the fuel cell stack 66 and the available driving time of the fuel cell vehicle. When limiting the hydrogen usage, it is desirable to give the user of the fuel cell system 15 a visual or sound notification so that he or she is aware of the fact that the hydrogen usage or the fuel cell output is limited.

The CPU of the control unit 68 then obtains a detection value PH of the second pressure sensor 40 (step S130) and compares the obtained detection value PH with the predetermined second in-use lower limit pressure $P_{H2}$ (step S140). In the hydrogen tank 60, the lower limit of the pressure in the tank is set to the minimum allowable pressure described above. The second in-use lower limit pressure $P_{H2}$ is determined in view of the minimum allowable pressure and a variation due to the detection sensitivity of the second pressure sensor 40. That is, the second in-use lower limit pressure $P_{H2}$ is set to a value with a margin of variation with respect to the minimum allowable pressure in order to ensure that the true value of the pressure in the hydrogen tank 60 will not become lower than the minimum allowable pressure as long as the detection value PH of the second pressure sensor 40 is not smaller than the second in-use lower limit pressure $P_{H2}$. When the detection value PH of the second pressure sensor 40 is larger than the second in-use lower limit pressure $P_{H2}$ (step S140: NO), the CPU of the control unit 68 repeats steps S130 and S140 until the detection value PH becomes equal to or smaller than the second in-use lower limit pressure $P_{H2}$.

When the CPU of the control unit 68 determines that the detection value PH of the second pressure sensor 40 is equal to or smaller than the second in-use lower limit pressure $P_{H2}$ (step S140: YES), the CPU of the control unit 68 performs an operation of estimating the inlet pressure $P_1$ of the pressure reducing valve 50 using a detection value $P_M$ of the first pressure sensor 42 that is the medium pressure sensor (step S150). The detection value $P_M$ of the first pressure sensor 42 indicates the outlet pressure $P_2$ of the pressure reducing valve 50. In step S150, as described with reference to FIG. 3, the CPU of the control unit 68 estimates the inlet pressure $P_1$ of the pressure reducing valve 50 by changing the outlet flow rate Q between the first flow rate and the second flow rate different from the first flow rate and obtaining the difference between the first pressure, which is the outlet pressure $P_2$ when the outlet flow rate Q is the first flow rate, and the second pressure, which is the outlet pressure $P_2$ when the outlet flow rate Q is the second flow rate.

As shown in FIG. 3, this difference between the first pressure and the second pressure increases as the difference between the first flow rate and the second flow rate increases. The larger the difference between the first pressure and the second pressure is, the higher the sensitivity of estimation of the inlet pressure $P_1$ of the pressure reducing valve 50 is. In the present embodiment, the outlet flow rate Q can be changed by the injector unit 52 that is the flow rate changing unit. Accordingly, in the present embodiment, the first flow rate, which is the outlet flow rate Q before being changed, is the minimum flow rate of the outlet flow rate Q that is changed by the injector unit 52, and the second flow rate, which is the outlet flow rate Q after being changed, is the maximum flow rate of the outlet flow rate Q that is changed by the injector unit 52. Specifically, the first flow rate, which is the flow rate before the changing, is the outlet flow rate Q when all the injectors of the injector unit 52 are closed, that is, the flow rate of 0. The second flow rate, which is the flow rate after being changed, is the outlet flow rate Q when all the injectors of the injector unit 52 are opened. With all the injectors closed, the CPU of the control unit 68 first obtains a detection value $P_M$ of the first pressure sensor 42. The CPU of the control unit 68 then opens all the injectors and obtains a detection value $P_M$ of the first pressure sensor 42. The CPU of the control unit 68 obtains the difference between the detection values $P_M$ before and after the changing of the outlet flow rate Q and estimates the inlet pressure $P_1$ of the pressure reducing valve 50 by referring to the map described above. That is, the CPU of the control unit 68 estimates the inlet pressure $P_1$ of the pressure reducing valve 50 by referring to the map and specifying the inlet pressure $P_1$ corresponding to the difference between the detection values $P_M$ of the first pressure sensor 42 before and after the changing of the outlet flow rate Q.

For example, in the case where the first flow rate, which is the outlet flow rate Q before being changed, is zero and the second flow rate, which is the outlet flow rate Q after being changed, is the flow rate $Q_1$ shown in FIG. 3, the CPU of the control unit 68 estimates that the inlet pressure $P_1$ of the pressure reducing valve 50 is 5.0 MPa, when the calculated difference between the detection values $P_M$ is equal to $\Delta P_a$. The CPU of the control unit 68 estimates that the inlet pressure $P_1$ of the pressure reducing valve 50 is 2.0 MPa, when the calculated difference between the detection values $P_M$ is equal to $\Delta P_b$.

After the CPU of the control unit 68 estimates the inlet pressure $P_1$ of the pressure reducing valve 50, it compares the estimated inlet pressure $P_1$ with the predetermined third in-use lower limit pressure $P_{H3}$ (step S160). The third in-use lower limit pressure $P_{H3}$ is a value determined in view of the above minimum allowable pressure of the hydrogen tank 60 and an estimation variation of the tank pressure due to the detection sensitivity of the first pressure sensor 42. That is, the third in-use lower limit pressure $P_{H3}$ is set to a value with a margin of variation with respect to the minimum allowable pressure in order to ensure that the true value of the pressure in the hydrogen tank 60 will not become lower than the minimum allowable pressure as long as the inlet pressure $P_1$ estimated using the detection value $P_M$ of the first pressure sensor 42 is not smaller than the third in-use lower limit pressure $P_{H3}$. Since the first pressure sensor 42 detects the gas whose pressure has been reduced by the pressure reducing valve 50, a pressure sensor having a narrower detection range and higher detection sensitivity than the second pressure sensor 40 disposed upstream of the pressure reducing valve 50 is used as the first pressure sensor 42. Accordingly, the third in-use lower limit pressure $P_{H3}$ is smaller than the second in-use lower limit pressure $P_{H2}$ by the margin of estimation variation of the sensor with respect to the minimum allowable pressure. Namely, the third in-use lower limit pressure $P_{H3}$ is set to a value smaller than the second in-use lower limit pressure $P_{H2}$. The third in-use lower limit pressure $P_{H3}$ is also referred to as the "reference pressure." When the estimated inlet pressure $P_1$ is larger than the third in-use lower limit pressure $P_{H3}$ (step S160: NO), the CPU of the control unit 68 repeats steps S150 and S160 until the estimated inlet pressure $P_1$ becomes equal to or smaller than the third in-use lower limit pressure $P_{H3}$.

When the CPU of the control unit 68 determines that the estimated inlet pressure $P_1$ is equal to or smaller than the third in-use lower limit pressure $P_{H3}$ (step S160: YES), it prohibits the use of hydrogen, that is, prohibits power generation of the fuel cell stack 66 using hydrogen (step S170), and ends the routine. When prohibiting power generation of the fuel cell stack 66, the CPU of the control unit 68 stops supply of hydrogen to the fuel cell stack 66 through the injector unit 52.

After the use of hydrogen is prohibited in step S170, the fuel cell vehicle equipped with the fuel cell system 15 can travel using only a driving power source other than the fuel cell stack 66 (e.g., a power storage device such as a secondary battery). When prohibiting the use of hydrogen in step S170, it is desirable to give the user of the fuel cell system 15 a visual or sound notification so that he or she is aware of the fact that hydrogen gas will not be used and the fuel cell stack 66 will not generate electric power.

According to the fuel cell system 15 of the present embodiment configured as described above, the inlet pressure $P_1$ of the pressure reducing valve 50 is estimated by changing the outlet flow rate Q of the pressure reducing valve 50 between the first flow rate and the second flow rate and obtaining the difference between the detection value $P_M$ of the first pressure sensor 42, which indicates the first pressure that is the outlet pressure $P_2$ when the outlet flow rate Q is the first flow rate, and the detection value $P_M$ of the first pressure sensor 42, which indicates the second pressure that is the outlet pressure $P_2$ when the outlet flow rate Q is the second flow rate. That is, when the remaining capacity of the hydrogen tank 60 has decreased, the inlet pressure $P_1$ of the pressure reducing valve 50 is estimated using the detection value $P_M$ of the first pressure sensor 42 that is the medium pressure sensor having a narrow detection range and high detection sensitivity, instead of the detection value PH of the second pressure sensor 40 that is the high pressure sensor. Accordingly, an estimated value varies less from the true value of the inlet pressure $P_1$, and detection accuracy of the inlet pressure $P_1$ is improved.

Especially when the remaining capacity of the hydrogen tank 60 has decreased and the inlet pressure $P_1$ has become closer to a relatively small vale close to the lower limit of the tank pressure, the outlet pressure $P_2$ changes by a larger amount with a change in outlet flow rate Q as shown in FIG. 3. Accordingly, the inlet pressure $P_1$ is accurately estimated by measuring the amount of change in outlet pressure $P_2$ using the first pressure sensor 42 that is the medium pressure sensor having a narrow detection range and high detection sensitivity. When estimating the remaining capacity of the hydrogen tank 60 using the estimated inlet pressure $P_1$ as the tank pressure of the hydrogen tank 60, this configuration reduces the amount by which the true value of the tank pressure at the time it is determined that the estimated tank pressure has decreased to the lower limit (third in-use lower limit pressure $P_{H3}$) exceeds the lower limit (minimum allowable pressure). Since a larger amount of hydrogen in the hydrogen tank 60 can thus be used, the driving range of the fuel cell vehicle equipped with the fuel cell system 15 is increased, and fuel efficiency is improved.

D. Other Embodiments (D1) The above embodiment uses the map produced by obtaining, for each inlet pressure $P_1$, the outlet pressures $P_2$ corresponding to the possible values of the outlet flow rate Q, as shown in FIG. 3. However, the disclosure may have a different configuration. The disclosure may have any configuration as long as the outlet flow rate Q is changed between the first flow rate and the second flow rate different from the first flow rate, the difference between the first pressure, which is the outlet pressure $P_2$ when the outlet flow rate Q is the first flow rate, and the second pressure, which is the outlet pressure $P_2$ when the outlet flow rate Q is the second flow rate, is obtained, and the inlet pressure $P_1$ is estimated using the relationship among the first flow rate, the second flow rate, and the difference. For example, only the correspondence between the inlet pressure $P_1$ and the difference between the first pressure, which is the outlet pressure $P_2$ when the outlet flow rate Q is the first flow rate, and the second pressure, which is the outlet pressure $P_2$ when the outlet flow rate Q is the second flow rate, may be stored as a map. Alternatively, only the correspondence between the inlet pressure $P_1$ and the slope of the change in outlet pressure $P_2$ that decreases as the outlet flow rate Q increases from the first flow rate to the second flow rate may be stored as a map.

(D2) In the above embodiment, when the outlet flow rate Q is changed to estimate the inlet pressure $P_1$, the first flow rate is the minimum flow rate of the outlet flow rate Q that is changed by the flow rate changing unit, and the second flow rate is the maximum flow rate of the outlet flow rate that is changed by the flow rate changing unit. However, the disclosure may have a different configuration. The inlet pressure $P_1$ can be estimated in a similar manner by changing the outlet flow rate Q of the pressure reducing valve 50 between the first flow rate and the second flow rate different from the first flow rate and detecting the outlet pressures $P_2$ corresponding to each flow rate. However, in order to improve the estimation accuracy, it is desirable that the difference between the first flow rate and the second flow rate be large.

(D3) In the above embodiment, the flow rate changing unit is the injector unit 52 including a plurality of injectors. However, the disclosure may have a different configuration. The flow rate changing unit may have any configuration as long as it can change the outlet-side flow rate of the pressure reducing valve 50 between the first flow rate and the second flow rate different from the first flow rate. For example, the flow rate changing unit may be formed by a flow regulating valve capable of controlling the flow rate of a gas flowing toward the downstream side as appropriate. The injector unit 52 used in the embodiment controls the flow rate by the operation of changing the injectors from the closed state to the open state, that is, by the operation that causes an increase in outlet flow rate Q. However, the disclosure may use a flow rate changing unit that controls flow rate by an operation that causes a decrease in outlet flow rate Q. In this case, when changing the outlet flow rate Q between the first flow rate and the second flow rate to estimate the inlet pressure $P_1$ of the pressure reducing valve 50 in step S150, the outlet flow rate Q is decreased instead of being increased. That is, the second flow rate, which is the outlet flow rate Q after being changed, is lower than the first flow rate, which is the outlet flow rate Q before being changed. If characteristics indicating the relationship between the outlet flow rate Q and the outlet pressure $P_2$ of the pressure reducing valve 50 vary between the case where the outlet flow rate Q is decreased and the case where the outlet flow rate Q is increased, a map corresponding to the case where the outlet flow rate Q is increased or the case where the outlet flow rate Q is decreased is prepared as a map to be used in step S150.

(D4) As shown by the formula (1), the relationship between the outlet pressure $P_2$ or the outlet flow rate Q and the inlet pressure $P_1$ in the pressure reducing valve 50 is affected by the gas temperature. Accordingly, for example, a map using the gas temperature as a parameter may also be used as the map that is used in step S150. In this case, the fuel cell system 15 may further include a temperature sensor that detects the temperature of hydrogen flowing through the pressure reducing valve 50, and the gas temperature detected by the temperature sensor may also be used to estimate the inlet pressure $P_1$ in step S150.

(D5) In the above embodiment, the pressure reducing valve 50 is a piston type unbalanced pressure reducing valve. However, the disclosure may have a different configuration. The pressure reducing valve 50 may be any type of unbalanced pressure reducing valve whose outlet pressure changes with an increase in inlet pressure. For example, the pressure reducing valve 50 may be a diaphragm type pressure reducing valve. Various types of pressure reducing valve can be adopted such as a direct acting pressure reducing valve and a pilot-operated pressure reducing valve.

(D6) In the above embodiment, in step S170, power generation of the fuel cell stack 66 using hydrogen is prohibited and supply of hydrogen to the fuel cell stack 66 is stopped in step S170. However, the disclosure may have a different configuration. In step S170, it is only necessary to limit the flow rate of hydrogen that is supplied to the fuel cell stack 66. Accordingly, in step S170, the flow rate of hydrogen that is supplied to the fuel cell stack 66 and the upper limit of the amount of electricity that is generated by the fuel cell stack 66 may further be reduced instead of stopping supply of hydrogen to the fuel cell stack 66.

(D7) In the above embodiment, the fuel cell system 15 includes the gas supply system 10. However, the disclosure may have a different configuration. For example, in a system including a hydrogen consuming device other than the fuel cell stack 66, such as a hydrogen engine, the gas supply system 10 may be used to supply hydrogen to the hydrogen consuming device. The gas stored in the gas tank of the gas supply system 10 may be a gas other than hydrogen. In a gas supply system that supplies a gas to a gas consuming device, an unbalanced pressure reducing valve and a gas sensor may be disposed in this order from the upstream side of the gas flow in a gas supply path that connects a gas tank and the gas consuming device. This gas supply system operate in a manner similar to that of the embodiment and thus has effects similar to those of the embodiment.

The disclosure is not limited to the above embodiment and can be implemented with various configurations without departing from the spirit and scope of the disclosure. For example, the technical features of the embodiment corresponding to the technical features of each form described in "SUMMARY" may be replaced or combined as appropriate in order to solve a part or all of the problems stated earlier or to achieve a part or all of the effects described above. The technical features may be omitted as appropriate if not described as essential in this specification.

What is claimed is:

1. A gas supply system, comprising:
    a gas tank that stores a compressed gas;
    a gas supply path connecting the gas tank and a gas consuming device that consumes the gas;
    an unbalanced pressure reducing valve in which an outlet-side pressure changes with an increase in inlet-side pressure and which is disposed in the gas supply path and reduces a pressure of the gas supplied from the gas tank;
    a pressure sensor that detects the outlet-side pressure of the pressure reducing valve;
    a flow rate changing unit that changes an outlet-side flow rate of the pressure reducing valve; and
    a control unit programmed to
        drive the flow rate changing unit to change the outlet-side flow rate of the pressure reducing valve between a first flow rate and a second flow rate different from the first flow rate,
        obtain a first pressure and a second pressure from the pressure sensor, the first pressure being a detection value of the pressure sensor when the outlet-side flow rate is the first flow rate, and the second pressure being a detection value of the pressure sensor when the outlet-side flow rate is the second flow rate, and
        estimate the inlet-side pressure of the pressure reducing valve using a relationship among the first flow rate, the second flow rate, and a difference between the first pressure and the second pressure.

2. The gas supply system according to claim 1, wherein
    the first flow rate is a minimum flow rate of the outlet-side flow rate that is changed by the flow rate changing unit, and
    the second flow rate is a maximum flow rate of the outlet-side flow rate that is changed by the flow rate changing unit.

3. The gas supply system according to claim 1, wherein
    the control unit has a prestored map, the map indicating a relationship between the outlet-side pressure of the pressure reducing valve and the outlet-side flow rate of the pressure reducing valve which is obtained in advance for each inlet-side pressure of the pressure reducing valve, and the control unit estimates the inlet-side pressure of the pressure reducing valve by referring to the map and specifying the inlet-side pressure of the pressure reducing valve which corresponds to the difference between the first pressure and the second pressure detected by the pressure sensor.

4. The gas supply system according to claim 3, wherein
    the gas is hydrogen,
    the pressure reducing valve includes
    an inlet chamber into which the gas discharged from the gas tank flows,
    an outlet chamber into which the gas from the inlet chamber flows while being decompressed,
    a valve body that reciprocates in a specific direction in the inlet chamber to open and close a communication passage that allows the inlet chamber and the outlet chamber to communicate with each other,
    a piston that is integral with the valve body and that slides in the specific direction in the pressure reducing valve when the valve body opens and closes the communication passage,
    an atmospheric pressure chamber separated from the outlet chamber by the piston,
    a first spring that is disposed in the inlet chamber and that biases the valve body in a closing direction of the valve body, and
    a second spring that is disposed in the atmospheric pressure chamber and that biases the piston in an opening direction of the valve body, and a relationship among the inlet-side pressure of the pressure reducing valve, the outlet-side pressure of the pressure reducing valve, and the outlet-side flow rate of the pressure reducing valve is given by the following formula $$P_2 = -\frac{k_2 - k_1}{S_2(3.8 \cdot 120 \cdot P_1)(\alpha \cdot \pi \cdot D_1 \cdot \sin\beta)} \sqrt{\frac{T}{273}} \cdot Q - \frac{S_1}{S_2} P_1 + \frac{F_{k2} - F_{k1}}{S_2} \pm \frac{F_\mu}{S_2} + P_{atm}, \quad (1)$$

where $P_2$ is the outlet-side pressure of the pressure reducing valve, $P_1$ is the inlet-side pressure of the pressure reducing valve, $P_{atm}$ is an atmospheric pressure, $k_1$ is a spring constant of the first spring, $k_2$ is a spring constant of the second spring, $S_1$ is an area of a cross section of the communication passage perpendicular to the specific direction, $S_2$ is an area of a cross section of the outlet chamber perpendicular to the specific direction, $F_{k1}$ is a force that is applied when the first spring biases the valve body in the closing direction, $F_{k2}$ is a force that is applied when the second spring biases the piston in the opening direction, $F_\mu$ is a frictional force during sliding of the piston, T is a temperature of the gas flowing through the pressure reducing valve, Q is the outlet-side flow rate of the pressure reducing valve, $D_1$ is a diameter of the cross section of the communication passage perpendicular to the specific direction, α is a contraction coefficient of an effective flow path when the gas flows through the communication passage, and β is an angle formed between a tip end of the valve body which faces the communication passage and the cross section of the communication passage perpendicular to the specific direction.

5. The gas supply system according to claim 1, wherein the control unit limits a flow rate of the gas that is supplied to the gas consuming device through the flow rate changing unit, when the estimated inlet-side pressure of the pressure reducing valve becomes equal to or lower than a predetermined reference pressure.

6. A method for estimating an internal pressure of a gas tank in a gas supply system including the gas tank that stores a compressed gas, the gas supply system further including
a gas supply path connecting the gas tank and a gas consuming device that consumes the gas,
an unbalanced pressure reducing valve in which an outlet-side pressure changes with an increase in inlet-side pressure and which is disposed in the gas supply path and reduces a pressure of the gas supplied from the gas tank,
a pressure sensor that detects the outlet-side pressure of the pressure reducing valve, and
a flow rate changing unit that changes an outlet-side flow rate of the pressure reducing valve, the method comprising:
driving the flow rate changing unit to change the outlet-side flow rate of the pressure reducing valve between a first flow rate and a second flow rate different from the first flow rate;
obtaining a first pressure and a second pressure from the pressure sensor, the first pressure being a detection value of the pressure sensor when the outlet-side flow rate is the first flow rate, and the second pressure being a detection value of the pressure sensor when the outlet-side flow rate is the second flow rate; and
estimating the inlet-side pressure of the pressure reducing valve using a relationship among the first flow rate, the second flow rate, and a difference between the first pressure and the second pressure.

* * * * *